July 22, 1947. F. W. RIDDINGTON 2,424,504
ELECTRIC HEATER HAVING THERMOSTATIC CONTROL AND SIGNAL MEANS
Filed May 1, 1943 2 Sheets-Sheet 1
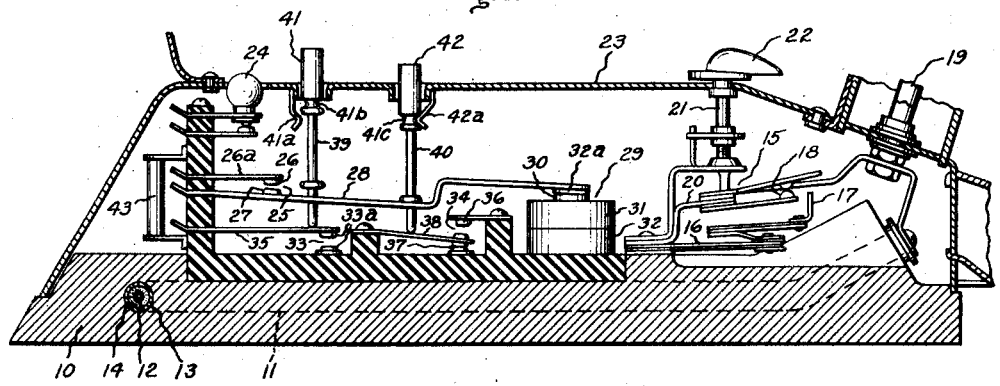
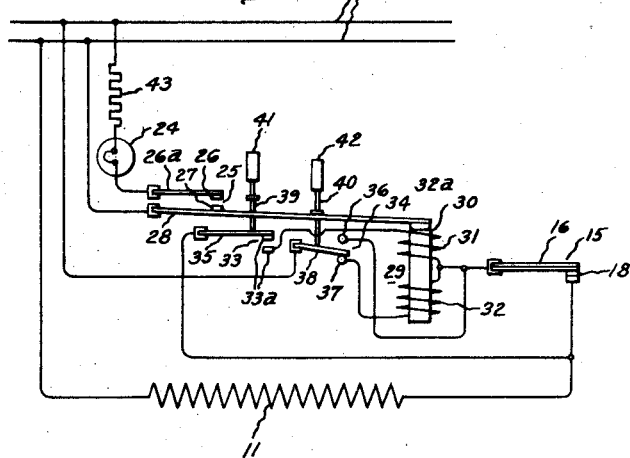
Inventor:
Frederick W. Riddington,
by Harry E. Dunham
His Attorney.

July 22, 1947.   F. W. RIDDINGTON   2,424,504
ELECTRIC HEATER HAVING THERMOSTATIC CONTROL AND SIGNAL MEANS
Filed May 1, 1943   2 Sheets-Sheet 2

Inventor:
Frederick W. Riddington,
by Harry E. Dunham
His Attorney.

Patented July 22, 1947

2,424,504

UNITED STATES PATENT OFFICE 2,424,504

ELECTRIC HEATER HAVING THERMOSTATIC CONTROL AND SIGNAL MEANS

Frederick W. Riddington, Ontario, Calif., assignor to General Electric Company, a corporation of New York Application May 1, 1943, Serial No. 485,327

3 Claims. (Cl. 219—25)

This invention relates to electric heaters, such as electrically heated flatirons, more particularly to electric heaters of this character which are provided with temperature responsive means for automatically holding a preselected temperature in the heated device, and it has for its object the provision of means for giving a signal when the iron is at the proper temperature set by the temperature responsive means.

More specifically, this invention contemplates the provision of an improved electrically heated device of the thermostatically controlled type which is provided with signal means, which signal means may be set first to give a signal when the device upon heating attains the predetermined high temperature which has been set by the thermostat; and which, if it then be desired to set the heated device for a lower temperature than the instant temperature held in the device, may be set to give a signal when the temperature of this device falls to this low temperature value.

Figure 3:
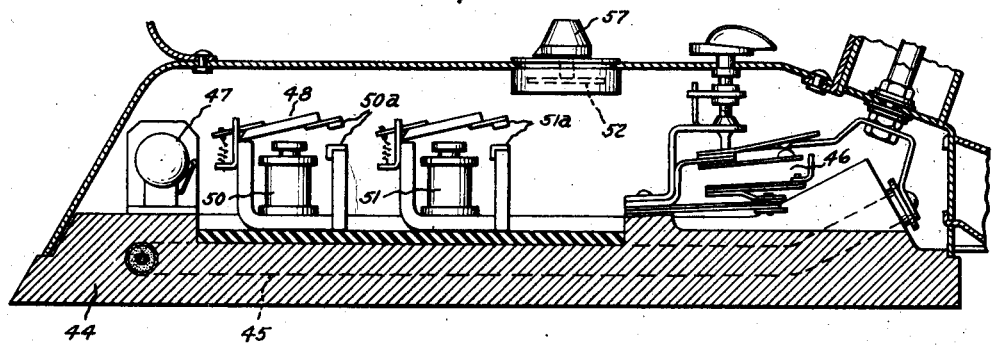
Figure 4:
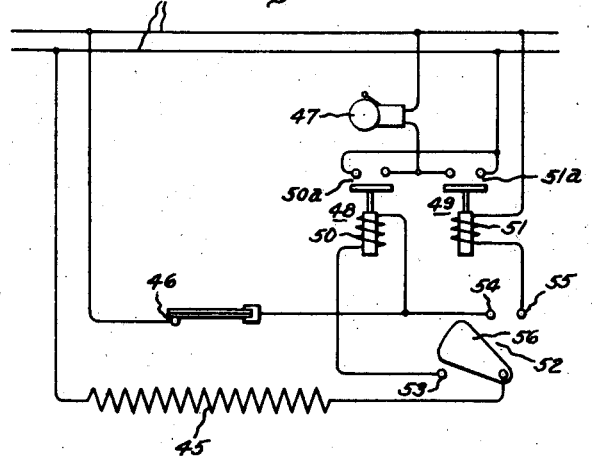

For a more complete understanding of this invention, reference should be had to the accompanying drawings in which Fig. 1 is a vertical sectional view taken through an electrically heated flatiron embodying this invention; Fig. 2 is a diagrammatic view illustrating certain control elements of the iron of Fig. 1 and the manner in which the signal device is controlled; Fig. 3 is a view similar to Fig. 1, but illustrating a modified form of this invention; and Fig. 4 is a diagrammatic representation of certain of the control elements of Fig. 3.

Referring more particularly to Figs. 1 and 2, this invention has been shown in one form as applied to an electrically heated flatiron provided with a sole plate 10 which is heated by means of an electrical heating element 11. The heating element 11 may be of any suitable type, but preferably will be of the sheathed type; as shown, this heating element comprises a helical resistance conductor 12 mounted within an outer metallic casing 13 and held in spaced relation with reference to the casing by means of a mass 14 of electrically insulating, heat conducting material, such as compacted magnesium oxide. The heating element 11 is cast within the sole plate 12, and it is automatically controlled to hold a preselected temperature in the sole plate 10 by means of a temperature responsive switch 15. While any suitable temperature responsive switch may be used for this purpose, I prefer to use the switch described and claimed in the United States patent to H. R. Batchelor No. 2,288,384, dated June 30, 1942. As there described, this device comprises a bimetallic temperature responsive bar 16. This bar, as clearly shown in Fig. 1, has one end clamped to the sole plate 10 so as to be in good thermal contact with it. The bar is arranged so that when its temperature rises it bends upwardly and when its temperature falls it bends downwardly. The bar carries an extension 17 which functions to control the operation of switch contacts 18 as the bar rises and falls. It will be understood that these switch contacts 18 are electrically connected in series with the heating element 11 and with the twin supply terminals 19, so that when the iron is "plugged in" to a supply source (indicated by the numeral 19a in Fig. 2), and the sole plate 10 heats to the high temperature set by the thermostat, the extension 17 will open the switch contacts 18 to deenergize the heater 11, and then when the sole plate temperature falls to a lower value, the thermostat will permit the contacts 18 to reclose to reenergize the heater 11. It will be understood that for any given setting of the temperature responsive device it has a predetermined temperature amplitude between the high temperature at which the contacts 18 are opened to shut off the heater and the lower temperature at which they are reclosed to reenergize the heater. By deenergizing and reenergizing the heater in this way, the thermostat operates to hold a substantially constant temperature in the sole plate. The contact structure 18 is mounted upon a resilient arm 20 which is adjustable toward and away from the extension 17 in order to change the temperature setting of the control device by means of an adjustment screw 21. This screw has a knob 22 outside of the iron shell 23, whereby the thermostat may be conveniently adjusted to hold the different preselected temperatures.

As pointed out previously, this invention contemplates the provision of suitable means for giving a signal when the iron is at the proper ironing temperature. In the form of the invention shown in Figs. 1 and 2, this signal means is an incandescent lamp 24. The energization of the lamp 24 is controlled by means of a switch 25 having a normally fixed contact 26 mounted upon an electrically conducting arm 26a, and a contact 27 mounted upon a resilient electrically conducting switch arm 28. The switch arm 28 by its inherent resiliency biases the contact 27 carried thereby toward the contact 26.

The operation of the switch arm 28 in turn is controlled by means of an electromagnet 29 which is provided with a central core 30 and a pair of operating coils 31 and 32, these coils having high and low resistances, respectively, relative to each other. The end of the switch arm 28 carries an armature 32a which coacts with the core 30. The energization of the coils 31 and 32 is controlled both by the operation of the thermostat 15 and by means of a pair of switches 33 and 34. The switch 33 has a pair of cooperating contacts 33a, as shown, one of which is mounted upon an electrically conducting, resilient switch arm 35. The inherent resiliency of the arm 35 is such that it biases the contacts 33a apart. The switch 34 is provided with a pair of spaced-apart fixed contacts 36 and 37 between which operates an electrically conducting resilient switch contact member 38. The inherent resiliency of the member 38 is such that it tends to close the contact 36. The operations of the two switch arms 35 and 38 are controlled by means of a pair of plungers 39 and 40 which in turn are controlled by means of a pair of push buttons 41 and 43 respectively, the buttons projecting through apertures provided for them in the top of the shell 33. The buttons are provided with spring latches 41a and 42a which are arranged to move into locking engagement with recesses 41b and 41c in the two buttons, respectively.

In operation: If it be desired to iron, the knob 22 is set to the desired high ironing temperature and then the iron is plugged into the supply source 19a. Then the push button 42 is depressed and held by its latch 42a in the depressed position. This operation of the push button 42 will close the switch contacts 37 and 38 of the switch 34 and it will depress the resilient signal lamp switch arm 28 to its position shown in Fig. 2. Under these conditions, thermostatic switch contacts 18 will be closed, because the thermostat 16 is cold, and as a result an energizing circuit will be completed as follows: From the lower conductor of the supply source 19a, through the heating element 11, the closed contacts 18, the low resistance electromagnet coil 32, the closed switch contacts 37 and 38, and thence to the upper conductor of the supply source 19a. This energizes the iron heater 11, and also energizes the magnet 30 which thereupon will coact with the armature 32a of the signal lamp switch 28 to hold the signal switch 25 in its open position, as shown in Fig. 2.

Following this, the heating element 11 will apply heat to the sole plate 10 until the sole plate attains the high temperature set by the knob 22. When it attains this temperature, the bimetallic blade 16 will have been moved up sufficiently far to open the contacts 18. And when these contacts open the heater unit 11 is deenergized and so also is the coil 32. When the coil 32 is deenergized it releases the switch arm 28 so that this arm is permitted to move upwardly to close the contacts 26 and 27 and thereby energize the signal lamp 24; it is to be understood that the upward biases of the switch arms 28 and 38 will force the push button 42 upwardly to its initial position, that is, they will be sufficiently strong to release the push button from the latch 42a. Connected in the energizing circuit of the lamp 24 is a controlling resistance 43 which is merely inserted in order that a low voltage filament lamp may be used.

Therefore, following this opening operation of the thermostat the signal lamp 24 will be energized and the switch contacts 36 and 38 will be closed. When the thermostat recloses in its cooling cycle responsively to the lowering of the temperature of the sole plate 10, the heating unit 11 will be reenergized through a circuit which may be traced from the lower conductor of the supply source 19a, through the heater unit 11, through the contacts 18, and the closed contacts 36 and 38. The thermostat thereafter will cycle between "off" and "on" positions to deenergize and reenergize this circuit in order to hold substantially the predetermined high temperature set. But during this entire operation the switch 25 will remain closed to continuously energize the lamp 24, thereby indicating that the iron had attained the proper temperature.

Should it be desired to go to a still higher temperature setting, the thermostat knob 22 will be reset accordingly, and the push button 42 again will be depressed, and the aforedescribed operation will be repeated, the signal lamp 29 being deenergized when the button 42 is depressed, and being reenergized only when the iron attains the selected higher temperature.

Now if it be desired to iron at a lower temperature, knob 22 will be set to the desired temperature value, and the push button 41 will be depressed, and will be held in its depressed position by means of its latch 41a. This operation will force the signal lamp switch arm 28 to its open position, and it will operate the switch arm 33 to close the contacts 33a. Therefore, an energizing circuit will be completed through the resistance element 11 and the high resistance coil 31 of the electromagnet so that again the switch 25 will be held in its open position; this circuit extends from the lower conductor of the supply source 19a, through the heater 11, the switch arm 35, switch contacts 33a, coil 31 and thence through closed contacts 36 and 38 to the upper conductor of the supply source. It is to be noted since the coil 31 has a relatively high resistance that even though the heating element 11 is now energized very little heat will be generated in the sole plate 10. Here also, it is to be noted that the thermostatic blade 16 will be in its position to keep the contacts 18 open; because it will be hot and will be above its present temperature setting. As a result, the sole plate 10 will cool down, and eventually it will cool to such a low temperature that the thermostat 16 will reclose the contacts 18. This operation will short circuit the coil 31 to thereby release the switch arm 28 and permit the contacts 26 and 27 to close and reenergize the signal lamp 24. This indicates that the iron is again at the proper ironing temperature. Then the thermostat 16 as before will operate between "off" and "on" positions as the temperature of the iron rises to the upper end of the temperature amplitude of the thermostat and falls to the lower end of the temperature amplitude so that the selected lower temperature will be held. And all of this time the lamp 24 will remain continuously energized to indicate that the iron had attained the proper temperature.

It is also possible to operate the iron as a normal iron without the signal device control at all. To do this, the two push buttons 41 and 42 are left in their upper positions so that the circuit of the heater includes only the thermostatic element 15 and the closed switch contacts 36 and 38.

In the form of the invention shown in Figs. 3 and 4, an audible signal device is provided as distinguished from the visual signal device of the first form. Here, the iron is provided with a sole plate 44, a heating element 45, and a temperature control device 46, all arranged in precisely the same way as are the corresponding elements of the first form of this invention described.

The signal device here comprises an electrically operated bell 47. Its energization is controlled by means of a pair of relays 48 and 49, which relays are provided with operating coils 50 and 51, and armature controlled contacts 50a and 51a respectively. The coil 50 is a low resistance coil, while the coil 51 is a high resistance coil. The energization of the two coils 50 and 51 is controlled by means of a manually operable switch 52 which is provided with spaced fixed contacts 53, 54 and 55 and a movable bridging contact 56. The bridging contact has a control knob 57 above the iron shell, as shown.

The iron as well as the coils are provided with a suitable electrical source of supply 58.

In the operation of this device, when it is desired to heat the iron up to a preselected temperature, the thermostat 46 is set to the desired temperature, and the bridging contact 56 is moved to bridge the fixed contacts 54 and 55. When this has been done an energizing circuit will be completed for the sole plate heater 45, which circuit is traced from the lower conductor of the supply source 58, through the heater 45, through the switch contact 56, contact 54, and thence through the thermostat 46 to the upper conductor of the supply source. It is to be understood that while the contact 55 is closed at this time, the high resistance coil 51 is shorted out by means of the thermostat. Therefore, as a result of this operation, the iron sole plate 44 will heat up, and when it attains the high temperature for which the thermostat 46 has been set, the thermostat will open, which operation will effect the energization of the high resistance coil 51 and cause it to close its contacts 51a; when these contacts close the bell 47 is energized to give an audible signal that the iron has attained its proper operating temperature. Here, however, when the thermostat 46 cycles between "on" and "off" positions the relay 49 will be alternately deenergized and reenergized, as distinguished from the continuous operation of the signal of the first form of this invention described.

Now if it be desired to operate at a higher temperature, the thermostat will be set to the desired higher temperature and, of course, it will close its switch contacts. When this happens the heater 45 is energized, the bell is deenergized, and the operation is as above described.

If while the iron is at the higher temperature, and it should be desired to operate it at a lower temperature, the thermostat 46 is set to the desired temperature, and the switch plate 56 is moved to close switch contact 53 alone. This operation will connect the low resistance coil 50 in series with the iron heater 45, but neither will be energized, because the thermostat 46 at this time will be open due to the fact that it still will be at a temperature higher than that set. However, when the iron cools down to the low temperature value set by the thermostat, the thermostat will reclose so as to energize both the heater 45 and the coil 50. When the coil 50 is energized it will close its contacts 50a to energize the bell 47 giving a signal that the iron has reached the desired low temperature. Here again, the bell will be alternately deenergized and reenergized as the thermostat 46 cycles between its opened and closed positions in functioning to hold substantially the desired temperature.

This iron also may be operated as a normal iron with the signal excluded. This operation is accomplished by moving the switch blade 56 to close contact 54 only. When this has been done only the heater 45 and the thermostat 46 are connected in series with the supply source 58. The signal control is excluded.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In an electrically heated flatiron having an electric heating element, temperature control and signal means for said flatiron comprising, an electroresponsive signal device, energizing circuits for said signal device and for said heating element, a thermostat responsive to the temperature of said flatiron for controlling said heating element to hold a substantially constant temperature in said flatiron and settable to vary said temperature, a pair of push buttons for "high" and "low" heats respectively, and switch means controlled by said push buttons and thermostat controlling said energizing circuits so that when said "high" heat push button is depressed and the iron is below the temperature for which said thermostat is set said heating element is energized but said signal device remains unenergized, and said switch means operating to energize said signal device circuit to cause the signal device to give a signal when said thermostat opens said heating element circuit responsively to the iron attaining the high temperature for which said thermostat is set and to continue its operation to give the signal while said thermostat cycles to open and close said heating element circuit to hold said temperature substantially constant, and said switch means also operating responsively to the setting of said thermostat to a temperature lower than the instant temperature of said device, which setting opens said heating element circuit, and to the depression of said "low" heat push button for opening the energizing circuit of said signal device and for reclosing it only responsively to the operation of said thermostat in reclosing said heating element circuit when the temperature of said iron falls to a value corresponding to the lower temperature setting of said thermostat.

2. In an electrically heated flatiron and the like provided with a heating element, a thermostat responsive to the temperature of said iron for controlling said heating element to maintain a preselected temperature in said iron, a signal device, switch means controlling the operation of said signal device, a pair of operating coils for said switch means, manually operable switch means for selectively controlling the energization of said coils to control said switch means, said manually operable switch means when in one position connecting one of said coils in circuit with said thermostat and said heating element to energize the coil to hold the switch means in position to prevent said signal device from operating, whereby when said thermostat opens responsively to said iron attaining a predetermined high temperature said coil is deenergized to permit said switch means to operate said signal device, and said manually operable switch means when operated to another position connecting said other coil in circuit with said heating element alone so that it is energized to hold said switch means in position to prevent said signal device from operating until said thermostat recloses at a lower temperature setting thereof, and said thermostat when thus reclosing functioning to deenergize said other coil to permit said switch means to operate said signal device to give a signal.

3. In an electrically heated device having a heating element, a thermostat for controlling said heating element to hold a substantially constant temperature in said device, a manually settable control element for said thermostat for varying said temperature, signal means comprising a signal device, control means separate from said control element manually operable selectively from "off" to "high" and "low" heat positions and jointly with said thermostat controlling said signal device and heating element so that when said control means is operated from said "off" position to said "high" heat position, said heating element is controlled to apply heat to said device while said signal device remains inactive, and said signal device is operated to give a signal when said thermostat shuts off said heating element upon said device attaining the high temperature set by said thermostat control element and thereafter to give said signal continuously as said thermostat operates to hold said temperature substantially constant, and said thermostat and control means further jointly controlling said signal device and heating element to shut off the heat and signal device when said thermostat control element is set for a lower temperature than the instant temperature of said device and said control means is operated to said "low" heat position, and to reapply the heat and give a continuous signal when said device attains said lower temperature and said thermostat operates to maintain it, and further, when said control means is in said "off" position, said thermostat may function under the control of said manually settable control element to hold various selected temperatures in said heating device while said signal device remains inactive to give a signal.

FREDERICK W. RIDDINGTON.

REFERENCES CITED

The following references are of record in the file of this patent:

UNITED STATES PATENTS

| Number | Name | Date |
|---|---|---|
| 2,208,432 | Samuels | July 16, 1940 |